F. SLOCUM.
COMBINATION TUG AND HAME ATTACHMENT FOR HORSE COLLARS.
APPLICATION FILED JAN. 30, 1911.
1,011,383.
Patented Dec. 12, 1911.
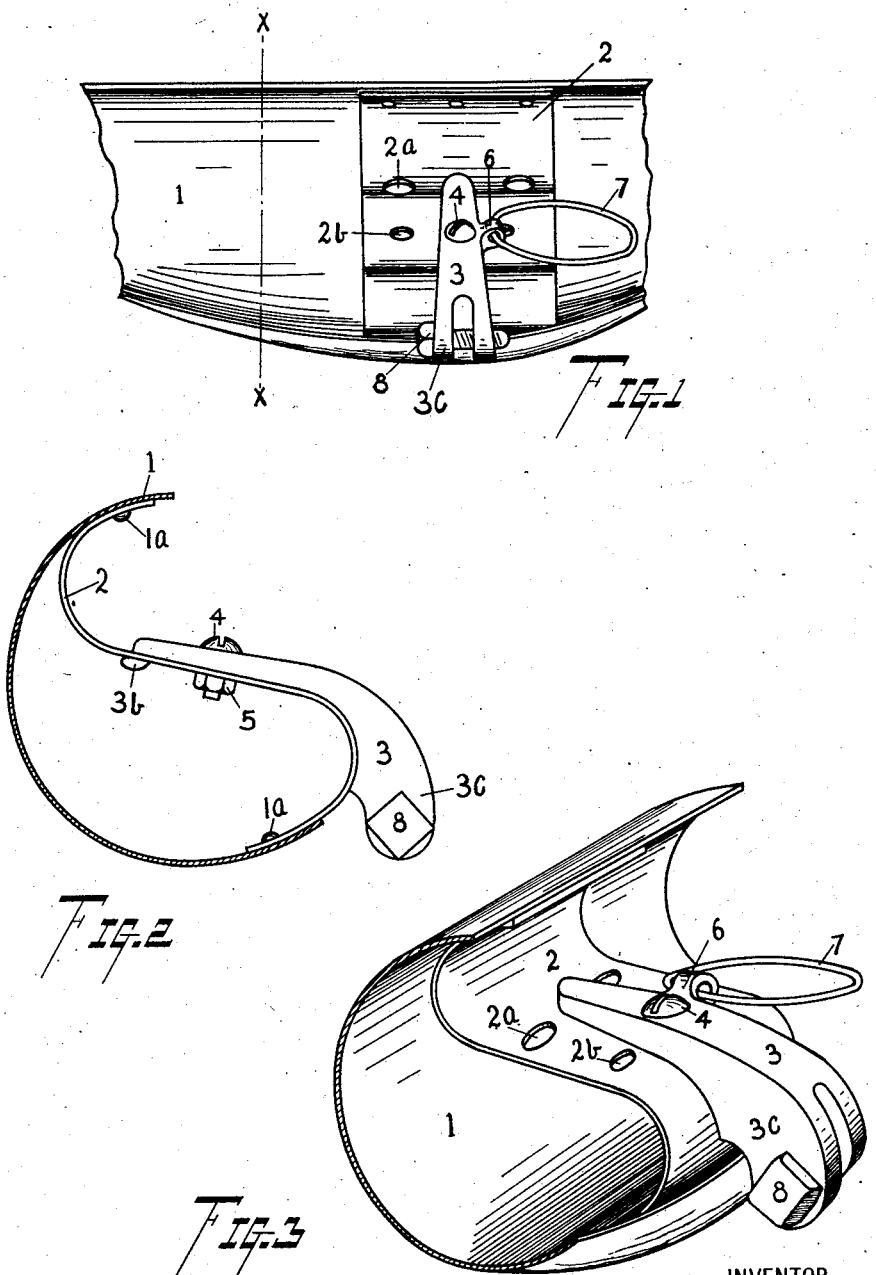

UNITED STATES PATENT OFFICE.

FRED SLOCUM, OF CARO, MICHIGAN.

COMBINATION TUG AND HAME ATTACHMENT FOR HORSE-COLLARS.

1,011,383.          Specification of Letters Patent.     Patented Dec. 12, 1911.

Application filed January 30, 1911. Serial No. 605,657.

*To all whom it may concern:*

Be it known that I, FRED SLOCUM, a citizen of the United States, residing at Caro, in the county of Tuscola and State of Michigan, have invented certain new and useful Improvements in Combination Tug and Hame Attachments for Horse-Collars; and I do hereby declare the following to be a full, clear, and exact description of the invention, such as will enable others skilled in the art to which it appertains to make and use the same.

This invention is an improvement in combination tug and hame attachments for horse collars.

The object of the invention is to provide a suitable tug and hame attachment used in connection with metallic horse collars, whereby the draft can be regulated so as to be uniform and perfectly balanced, thereby well distributing the work and making the most important part of the harness helpful to the horse.

A further object is to provide a simple attachment that can be easily and quickly adjusted, and one that is not liable to get out of order, and if any of the parts should break, they can be replaced very readily.

With these and certain other objects in view, which will appear later in the specifications, my invention consists in the devices illustrated in the accompanying drawings, in which—

Figure 1 is a side view broken away in part, showing my improved tug and hame attachment secured to the horse collar; Fig. 2 is a section through the line $x$—$x$ of Fig. 1; and Fig. 3 is a perspective view.

As is clearly shown in the drawings, the device consists in the usual metal shell 1, which is shown in the drawings as broken away, to each side of which is riveted as at 1ª, an S-shaped bracket or hame fastening 2. By securing the ends of this bracket at the out-turned edges of the metal shell 1, the rivets are so located as to avoid galling the horse's neck.

The bracket 2 is provided with a plurality of openings 2ª, 2ᵇ. A hame bracket 3 is secured to the bracket 2 by a bolt 4 and nut 5 secured through one of the openings 2ᵇ. The end 3ᵇ of the hame bracket is provided with a hook-like member which projects into one of the openings 2ª, thereby preventing the hame bracket from accidentally pulling out. The openings 2ª are for the purpose of enabling the location of the bracket 3 to be shifted up or down, thereby regulating the draft so that the work of the horse is equally distributed, and preventing the horse's shoulders rubbing against the collar and becoming sore. The opposite end 3ᶜ of the hame bracket is bifurcated for the insertion of the usual metal eye of the leather tugs (not shown). The tug eye is held in place by the bolt 8. The hame bracket 3 is provided with a loop 6 for receiving the ring 7 through which a harness strap (not shown) passes.

By the means above described I have provided a simple, inexpensive and very durable tug and hame attachment for metallic horse collars, so designed and attached that it will not injure the horse's neck, slip out of place or become unfastened.

Having described my invention, what I claim and desire to secure by Letters Patent, is:—

1. In combination; a metallic horse collar in the form of a shell, a pair of brackets, one secured to each side of said shell and provided with a plurality of openings, a hame bracket secured to each of said first-named brackets, one end of each of said hame brackets being hook-shaped and adapted to be received into one of said openings, the opposite end being bifurcated, a bolt through the bifurcated end of each of said hame brackets, and a loop formed on each of said hame brackets near the hooked end for receiving a ring, for the purposes set forth.

2. In combination; a metallic horse collar in the form of a shell having out-turned edges, a pair of S-shaped brackets, the ends of each bracket secured to the out-turned edges of said shell, a pair of hame brackets, and means for adjustably securing each of said hame brackets to each of said S-shaped brackets.

3. In combination; a metallic horse collar in the form of a shell having out-turned edges, a pair of S-shaped brackets, the ends of each bracket secured to the out-turned edges of said shell, each of said brackets formed with a plurality of openings, a pair of hame brackets removably secured respectively to said S-shaped brackets, one end of each of said hame brackets being hook-shaped and adapted to be received into one of said openings, and means at the opposite end of each of said hame brackets for se-
in presence of two witnesses.

In testimony whereof, I affix my signature in presence of two witnesses.

FRED SLOCUM.

Witnesses:
CHRISTINE A. BRAIDEL,
GEO. W. SMITH.

Copies of this patent may be obtained for five cents each, by addressing the "Commissioner of Patents, Washington, D. C."